United States Patent [19]

Rise

[11] Patent Number: 4,496,042
[45] Date of Patent: Jan. 29, 1985

[54] HUMPER CONVEYOR

[75] Inventor: William E. Rise, Utica, Mich.

[73] Assignee: Android Corporation, Auburn Heights, Mich.

[21] Appl. No.: 381,613

[22] Filed: May 24, 1982

[51] Int. Cl.³ .............................................. B65G 25/00
[52] U.S. Cl. ...................................... 198/774; 198/763
[58] Field of Search ................ 198/774, 763, 756, 757

[56] References Cited

U.S. PATENT DOCUMENTS

| | | | |
|---|---|---|---|
| 3,605,996 | 9/1971 | Holman | 198/763 |
| 3,703,233 | 11/1972 | Hacker | 198/763 |
| 4,026,409 | 5/1977 | Stockdale | 198/774 |
| 4,042,104 | 8/1977 | Furlette et al. | 198/774 |
| 4,155,443 | 5/1979 | Schuricht | 198/774 |
| 4,299,323 | 11/1981 | Koch et al. | 198/774 |

Primary Examiner—Joseph E. Valenza
Assistant Examiner—Kyle E. Shane
Attorney, Agent, or Firm—Stephenson & Boller

[57] ABSTRACT

An improved arrangement for mounting the lift bar of a humper type conveyor in which the lift bar is mounted on the conveyor frame structure by means of support arm structure. The support arm structure is disposed generally parallel to the path of travel of conveyed articles and a mount is provided for mounting one end of the support arm structure on the conveyor frame and another mount for mounting the lift bar on the other end of the support arm structure. The preferred construction for the support arm structure comprises a pair of spaced apart fiberglass elements which are separated at their ends by spacers. An eccentric is disposed to operate through the second-mentioned mount to impart displacement to the lift bar, the fiberglass support arm elements resiliently flexing in the process.

15 Claims, 11 Drawing Figures

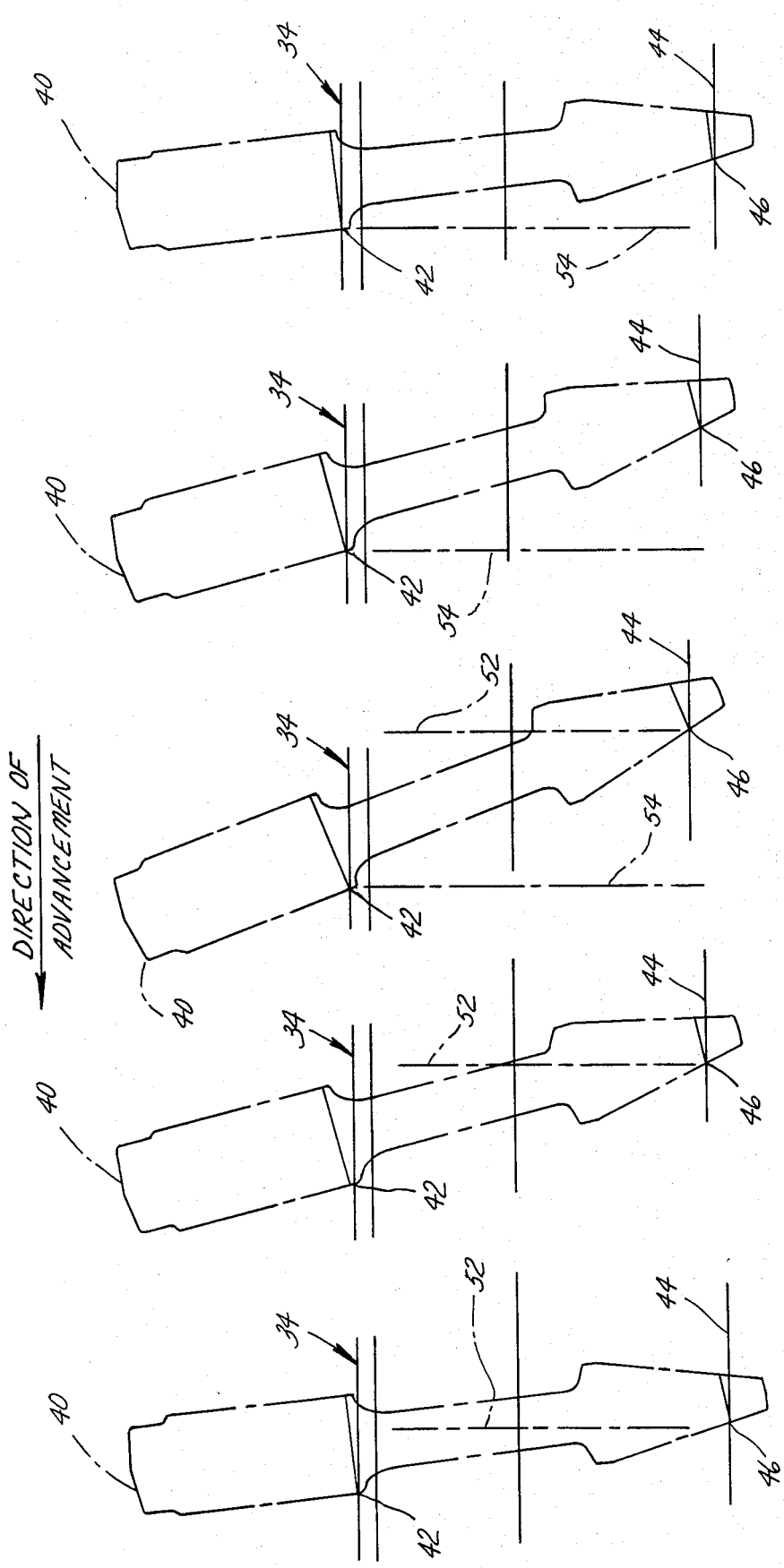

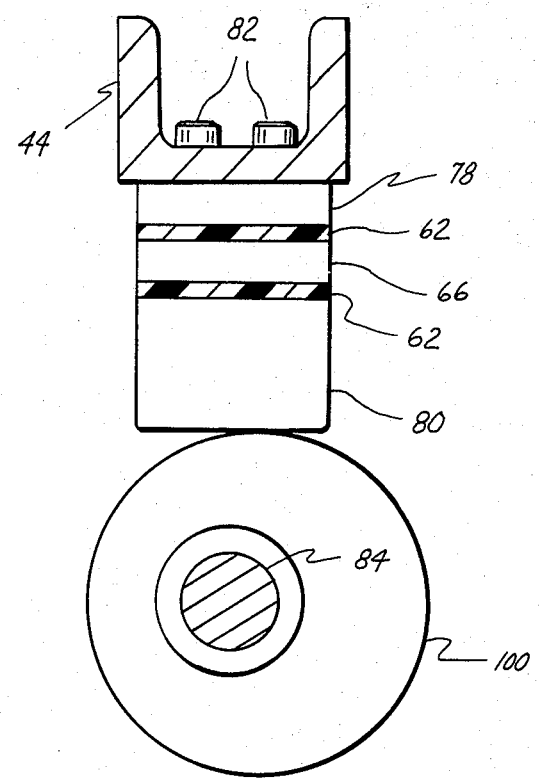
fig. 8
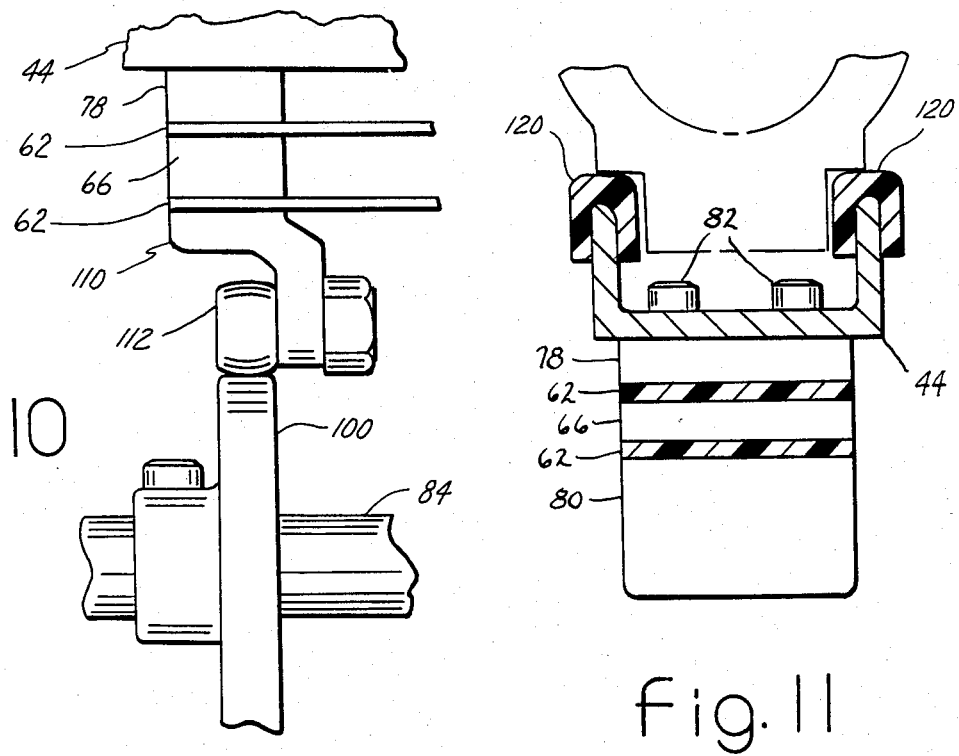
fig. 10
fig. 11

4,496,042

HUMPER CONVEYOR

BACKGROUND AND SUMMARY OF THE INVENTION

This invention relates to conveyors and in particular to a type of conveyor commonly known as a humper conveyor. More specifically the invention relates to a improvement for operating the lift bar of this type of conveyor.

In a humper conveyor the articles being conveyed are supported by rail and lift bar structures. The rail structure is affixed to the frame of the conveyor while the lift bar is displaceable toward and away from the rail structure. Typically the rail and lift bar structures will be horizontally disposed parallel to each other and the lift bar will underlie the rail structure. The articles are supported both on the lift bar and rail structures with the points of support for each article being out of vertical alignment. As the lift bar is displaced toward the rail structure, the articles pivot about their points of support on the lift bar with the result that their points of support on the rail structure move forwardly. When the lift bar is displaced away from the rail structure, the articles pivot about their points of support on the rail structure with the result that their points of support on the lift bar structure move forwardly. In this way the articles are advanced along the direction of travel. As can be appreciated the conveyance action makes use of the force of gravity and hence while the articles are supported on the lift bar and rail structures simultaneously, their support on either one of the lift bar and rail structures alone is unstable. This instability provide the pivotal motion which occurs during operation resulting in forward advance of the articles.

In prior humper conveyors various means have been utilized to operate the lift bar. Often the lift bar is guided by vertically arranged guides and vertical motion is imparted to the lift bar by a drive means. It has also been a practice to employ power cylinders for operating the lift bar. Because these conveyors may be used to convey large numbers of heavy articles, the use of hydraulic cylinders has been common.

A disadvantage of a hydraulic cylinder is that it is not conducive to compactness of the conveyor due to the length of the cylinder and cylinder rod. A further disadvantage is that service procedures for hydraulic cylinders can be cumbersome, and the possibility for leakage or spillage of hydraulic fluid is always present. It is also hard to synchronize the lift and fall of two or more laterally displaced cylinders.

The present invention is directed to an improvement in a humper conveyor whereby the conveyor can be made more compact and which does not employ either hydraulic cylinders or vertical guides for the lift bar drive. The preferred embodiment is especially advantageous because of its efficient use of materials and resultant performance, along with no lubrication requirements and no wearing members.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIGS. 2 through 6 are position diagrams illustrating the motion of a conveyed article over one complete operating cycle of the conveyor drive.

FIG. 8 is a sectional view taken substantially in the direction of arrows 8—8 in FIG. 1 and enlarged.

FIG. 10 is a view similar to FIG. 9 illustrating an alternate construction.

FIG. 11 is a view similar to FIG. 8 illustrating an alternate construction.

DESCRIPTION OF THE PREFERRED EMBODIMENT

Figure 1:
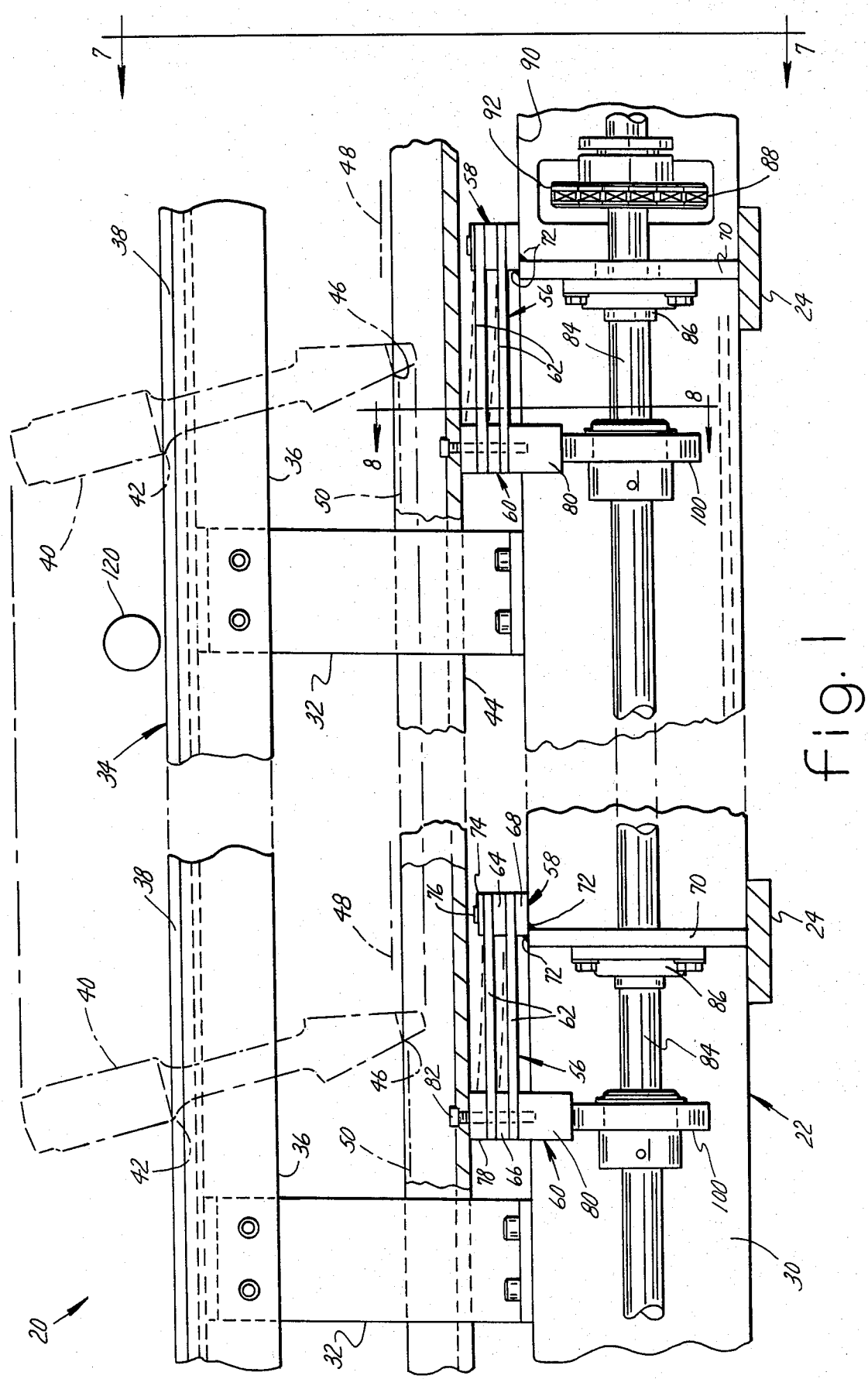
FIG. 1 is a fragmentary side elevational view of a humper conveyor embodying principles of the present invention.
Figure 7:
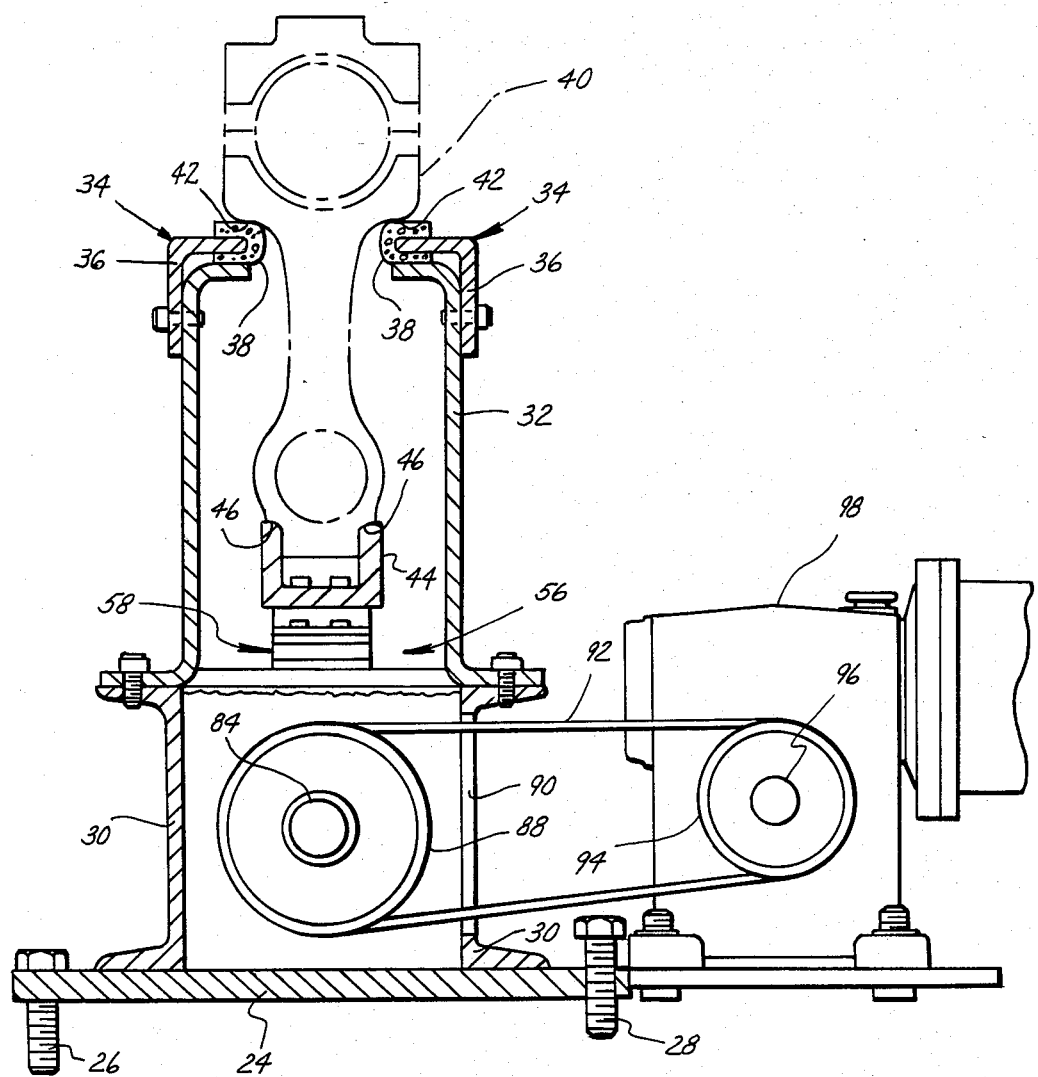
FIG. 7 is a right-hand view of FIG. 1 taken substantially in the direction of arrows 7—7 in that figure.
Figure 9:
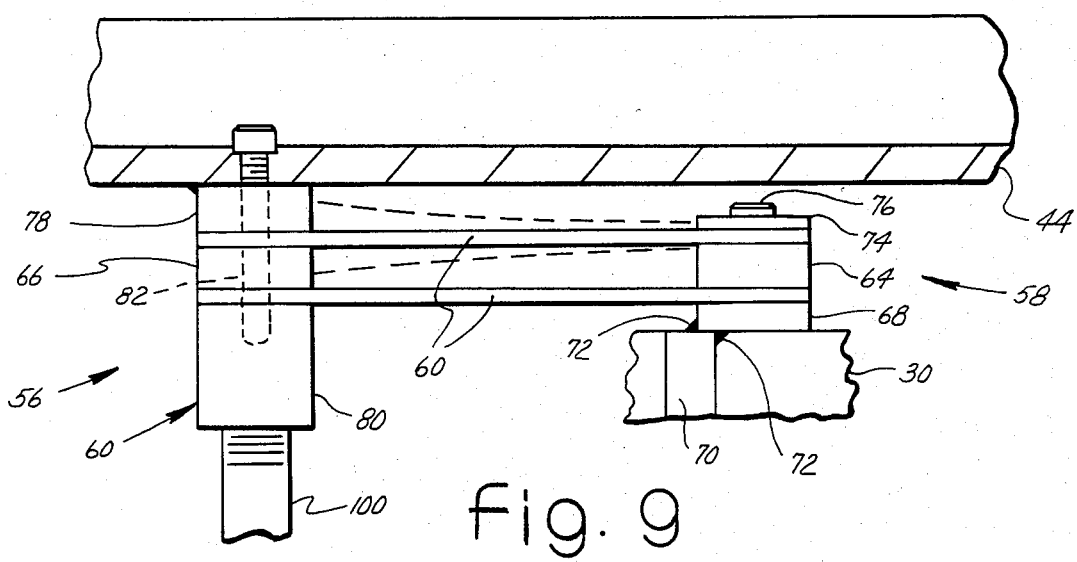
FIG. 9 is an enlarged view of a portion of FIG. 1

FIG. 1 illustrates a humper conveyor 20 embodying principles of the present invention with FIGS. 7, 8, and 9 showing further detail. Conveyor 20 comprises a framework designated by the general reference numeral 22. The framework comprises baseplate members 24 containing anchoring and leveling screws 26, 28 respectively at various locations via which the conveyor may be secured to the floor of an installation site, or onto support legs to provide desired conveyor height. The framework further includes laterally spaced side channels 30 extending lengthwise of the conveyor and which are supported on the baseplate members 24. Supported on the upper flanges of the side channels 30 at selected longitudinal locations are rail support members 32, and these rail support members 32, in turn support the rail structure 34 of the conveyor. The rail structure 34 comprises a pair of laterally spaced, longitudinally extending parallel rail members 36 which are secured to the upper portions of the rail support members 32. The rail members are in the form of right angle metal channels. Applied over the confronting edges of the opposite channels are protective flange covers 38, polyurethane for example.

The illustrated conveyor 20 is designed for conveyance of engine connecting rods 40 and the connecting rods are supported by the rail members 36 on opposite lateral sides at the points indicated by the reference numeral 42, which points rest on flange covers 38.

The conveyor further comprises a lift bar 44 which is located laterally centrally of the rail structure and directly below the opening between the confronting flange covers. The lift bar is in the form of a U-shaped channel which extends longitudinally lengthwise of the conveyor parallel to the rail members. The channel is shaped to provide support for the lower ends of the connecting rods 40. For this purpose the channel engages the connecting rods at the points indicated by the reference numerals 46. This lift bar may also be covered with a protective covering, such as polyurethane, for example.

In operation lift bar 44 is cyclically raised and lowered between an up position, shown in broken lines in FIG. 1 and designated by the reference numeral 48, and a down position, also shown in broken lines in FIG. 1 and designated by the reference numral 50. The solid line position of the lift bar in FIG. 1 represents an intermediate position between the two broken line positions. It will be noted in FIG. 1 that the connecting rods are supported on the lift bar and rail structures at an angle which is inclined from the vertical. This is necessary for conveyance of the articles along the length of the conveyor.

The manner in which the motion of the articles occurs can be best seen from consideration of FIGS. 2 through 6. FIG. 2 illustrates a connecting rod 40 supported on the rail and lift bar structures with the lift bar in the position corresponding to reference numeral 50. As the lift bar is displaced upwardly toward the rail structure the support point 46 remains in frictional engagement with the lift bar 44 so that there is no slipping of the article on the lift bar. This tends to lift the article off of its support with the rail members, but due to the inclination of the article, it does not in fact lift off of the rails but rather pivots about the points 46 with the result that the support points 42 move forwardly along the rail. Thus FIG. 3 represents an intermediate point in the upward displacement of the lift bar and it can be seen that the support points 42 have advanced forwardly along the rail members from the position which they had in FIG. 2. The vertical line designated by the reference numeral 52 denotes a fixed reference for purposes of illustrating the advance.

FIG. 4 illustrates the position which the connecting rod assumes when the lift bar is at its point of closest approach to the rail members. The points 42 are even further advanced from the FIG. 3 position. As the lift bar is now displaced downwardly from the FIG. 4 position, the support points 42 now remain in non-slip contact with the rail members. The downward displacement of the lift bar allows the lower points of support 46 to move forwardly along the lift bar due to the force of gravity acting on the connecting rod tending to pivot it about the upper support points 42 toward the vertical. Thus in FIG. 5, which represents an intermediate position during downward displacement, it can be seen that the lower support points 46 have moved forwardly along the lift bar in relation to a fixed vertical reference plane 54. The lift bar continues downwardly until it reaches the position shown in FIG. 6 which corresponds to the inclined orientation of the connecting rod as in FIG. 2. As the one complete cycle illustrated by FIGS. 2 through 6 is continuously repeated, the articles are thereby advanced along the conveyor.

In order to provide a suitable friction surface for the lower support points 46 on the lift bar it is appropriate to use a suitable procedure such as applying a friction and protective coating to the lift bar, such as polyurethane. The arrangement of the lift bar and the support rail are such that the articles can never assume a vertical upright position whereby they would be stably supported on either the lift bar or the rail. It is necessary that with respect to each of the respective support points 42, 46 alone, the articles be in a condition of imbalance allowing them to pivot so as to accomplish the desired forward motion along the path of travel in response to the vertical displacement of the lift bar.

The lift bar is supported on frame 22 by means of support arm structures which are located at selected points along the length of the conveyor. These support arm structures are designated by the reference numerals 56. Each support arm structure 56 comprises a mount 58 via which it is affixed to frame 22 and a second mount 60 via which it is affixed to lift bar 44. The illustrated preferred form of each support arm structure 56 comprises a pair of flat, yieldably resilient support arm members 62 which are disposed generally horizontal and parallel to the direction of travel of the conveyed articles. The support arm members are spaced apart vertically at each mount by means of spacer blocks 64 and 66 respectively. Mount 58 comprises a bar 68 laterally spanning the top flange surface of the side channels 30. Further support is provided by locating bar 68 proximate a main bearing support plate 70 where it can be welded to the main bearing support plate as indicated at 72. The lower support arm member is disposed at one end flat against the top of bar 68; spacer 64, the upper support arm member 62 and finally a retainer plate 74 are sucessively arranged to form the mount, and all these components are held in assembled relationship by means of screws 76 which pass through appropriate clearance holes in the elements 74, 62, 64 and 62 and into corresponding tapped holes in bar 68. The screws 76 are tightened so that these elements are securely held together.

The other mount 60 further comprises a spacer 78 disposed between the lift bar and the upper support arm member 62 and a block 80 below the lower support arm number 62. A pair of screws 82 pass through suitable clearance holes in lift bar 44, spacer 78, the upper support arm member 62, spacer 66, and the lower support arm member 62 to thread into corresponding tapped holes in block 80. The screws 82 are tightened to secure these components in assembled relationship.

The support arm members 62 are of flexible resilient material which provide a cantilever flexing action as indicated by the broken lines in FIGS. 1 and 9. The support arm members are sufficiently long that the vertical component of motion of mount 60 is small in relation to the length of the support arm member, so that the displacement motion of the lift bar is essentially only vertical although it will be appreciated that there is a small horizontal component due to the nature of the geometry. An especially good material for the support arm members 62 is a fiberglass spring, a material that is tough, durable, resilient, inert, with an extremely long, or even infinite, fatigue life and generally immune to common hostilities which may be present in certain industrial installations.

The conveyor further comprises a drive via which motion is imparted to the lift bar. In the illustrated preferred embodiment the drive is operative through the mounts 60. The drive comprises a drive shaft 84 extending lengthwise of the conveyor and disposed centrally between the two side channels 30. The drive shaft is suitably journaled on bearings 86 which are located at bearing mounting plates 70. The power input to shaft 84 is via a chain drive located at the right-hand end of FIG. 1. A sprocket wheel 88 is affixed to shaft 84 and a suitable clearance hole 90 is providd in one of the side channels 30 through which an endless drive chain 92 passes. The drive chain loops around sprocket 88 (see FIG. 7) and at the other end the drive chain loops around a drive sprocket 94. The drive sprocket 94 is affixed to the output shaft 96 of a power drive 98. The preferred construction for power drive 98 is an electric motor driven unit operating through a suitable gear reduction. The electric motor is also preferably a multispeed or variable speed drive.

Affixed to shaft 84 at the location of each mount 60 is an eccentric 100. The eccentric is arranged to engage the undersurface of block 80 and hence to lift bar 44 via the mount 60. FIG. 8 illustrates a profile for the eccentric. Theoretically the eccentric has a line of contact (which appears as a point in FIG. 8) with the undersurface of element 80. Due to the nature of a particular eccentric profile, it is possible that the lateral position of this line of contact may not be stationary as the eccentric rotates. For example, FIG. 8 shows the line of contact to be to the right of a vertical plane passing through the axis of the shaft. Because of this factor the action of the eccentric on the lift bar may be such as to tend to create a torque tending to twist the lift bar about a longitudinal axis. The illustrated construction of the support arms 56 excellently resists any such torsion because it possesses a high torsional resistance. Yet it is capable of freely flexing in a cantilever fashion so as to allow the vertical motion to be imparted to the lift bar.

It will be noted that there is no further support or guide structure provided for the lift bar other than the support arm structures 56. In other words vertical guides are not required. The drive is essentially a mechanical one (except for the electric motor) and no hydraulic devices such as hydraulic cylinders are utilized. The resulting construction is especially compact with minimal maintenance anticipated. This means that with the invention a humper type conveyor can be installed in a trench with the drive shaft below floor level. With prior conveyors using hydraulic cylinders, that type of an installation would not be realistically feasible, due to installation and maintenance considerations.

It is fully contemplated that alternate embodiments may be constructed using principles of the invention. FIG. 10 illustrates one such embodiment in which the block 80 is replaced by a bracket 110 containing a roller 112 which rides against the eccentric. Also while the illustrated support arm structure is in the nature of a cantilever, it will be appreciated that other equivalent support arm structures may be employed without specifically being of a cantilever nature. The illustrated construction comprises the fiberglass elements being yieldably resilient. Other constructions are contemplated in which the support arms themselves are non-resilient in their construction but yieldably resilient means is provided elsewhere in the construction. The illustrated construction is however preferred for its economy is construction and its particular suitability to industrial applications. It is also unusually quiet in operation, and can thereby contribute to reduction in ambient noise levels in plants. The particular number of support arm structures 56 which are used in a given conveyor will depend upon the length of the conveyor. Generally plural structures will be employed with an eccentric for each.

It will be observed in the drawing figures that the amount of displacement of the support arm members away from their solid line position is not symmetrical. In other words the displacement in the upward direction is somewhat greater than that in the downward direction. The reason for this is that it is not essential that the eccentrics remain in operative engagement with the mounts 60 over a full 360° revolution of the eccentrics. Stated another way the basic purpose of the eccentrics is to impart upward motion from some lower reference point and in this instance the lower reference point is indicated by the lower broken line position. In the free condition of the support arm members without the lift bar being attached, they assume a flat horizontal orientation. The weight of the lift bar and of the articles which are supported on the conveyor serve to deflect the support arm members downwardly from that horizontal orientation. Thus in many instances the actual amount of vertical displacement of the lift bar is not particularly critical although it is the amount of vertical displacement of the lift bar which determines exactly how far each article advances during one rotation of the drive shaft; through use of the variable speed motor it is possible to speed up or slow down shaft 84 so as to achieve a desired rate of travel of the articles along the conveyor. Automatic control could be achieved through use of a sensor 120 which monitors articles on the conveyor and signals the drive to speed up or slow down as the condition being sensed indicates. One possible technique is to slow down the motor when there is an accumulation of parts on the conveyor due to the parts stacking up at the end. When the stack-up is alleviated, the motor is speeded up.

FIG. 11 shows an alternate construction for lift bar 44 in which the edges of the channel flanges are capped by flange covers 120. The flange covers may be a suitable plastic molded in place or attached with adhesives onto the metal channel which forms the lift bar. They serve a dual purpose: one, they provide a friction and protective coating; two, they adapt a standard dimensioned channel to the dimensions of the particular type of workpieces to be transported by the conveyor. For the latter purpose, the dimensions of the flange covers will depend upon the dimensions of the workpiece in relation to the dimensions of the lift bar channel.

It should also be pointed out that the conveyor can be designed for conveyance along either a straight line path or along a curved line path. Examples of curved line paths are 90° and 180° turns. For the illustrated example, forty-eight inch radii are suitable for the curved sections. The drive shaft is however not curved for obvious reasons; rather it is segmented into individual sections coupled together by universal joints.

While a preferred embodiment of the invention has been disclosed, it will be appreciated that other embodiments are contemplated within the scope of the following claims.

What is claimed is:

1. In a humper type conveyor for conveying articles along a path of travel having frame structure, rail structure supported on the frame structure, and lift bar structure which is cyclically displaceable toward and away from the rail structure, said rail and lift bar structures being constructed and arranged in substantial parallelism along the path of travel to cooperatively support conveyed articles along the path of travel and to convey them in such a manner that displacement of the lift bar structure toward the rail structure causes the articles to pivot about their points of support on the lift bar structure with the result that their points of support on the rail structure move forwardly along the path of travel and such that during displacement of the lift bar structure away from the rail structure the articles pivot about their points of support on the rail structure with the result that their points of support on the lift bar structure move forwardly along the path of travel, the improvement for mounting the lift bar structure on the frame structure which comprises resiliently yieldable support arm structures disposed along the length of the lift bar, each resiliently yieldable support arm structure comprising respective horizontally spaced apart points of mounting to said frame structure and said lift bar structure respectively, each said support arm structure being operable as said lift bar structure is cyclically displaced toward and away from said rail structure such that its point of mounting to said lift bar structure executes an arcuate path of displacement relative to its point of mounting to said frame structure resulting in the lift bar structure being bodily similarly arcuately displaced relative to the frame structure, such arcuate displacements each bearing respective components of motion which are parallel and perpendicular respectively to the path of travel of the articles with the parallel component of motion being noticeably less than the perpendicular component of motion.

2. In a humper type conveyor for conveying articles along a path of travel having frame structure, rail structure supported on the frame structure, and lift bar structure which is cyclically displaceable toward and away from the rail structure, said rail and lift bar structures being constructed and arranged in substantial parallelism along the path of travel to cooperatively support conveyed articles along the path of travel and to convey them in such a manner that displacement of the lift bar structure toward the rail structure causes the articles to pivot about their points of support on the lift bar structure with the result that their points of support on the rail structure move forwardly along the path of travel and such that during displacement of the lift bar structure away from the rail structure the articles pivot about their points of support on the rail structure with the result that their points of support on the lift bar structure move forwardly along the path of travel, the improvement for mounting the lift bar structure on the frame structure which comprises support arm structure disposed generally parallel to the path of travel of the articles, mounting structure via which the support arm structure mounts on the frame structure and mounting structure via which the lift bar structure mounts on the support arm structure, and in which the support arm structure comprises a resiliently yieldable support arm.

3. The improvement set forth in claim 2 wherein the resiliently yieldable support arm comprises a flat fiberglass element.

4. The improvement set forth in claim 1 in which each said support arm structure comprises a pair of confronting flat fiberglass elements separated by spacer means.

5. The improvement set forth in claim 4 in which a drive means acts directly upon and is operable through the point of mounting of one of said support arm structures to said lift bar structure to impart motion to the lift bar structure.

6. The improvement set forth in claim 5 wherein the drive means includes an eccentric which is disposed to operatively engage the point of mounting of said one support arm structure to said lift bar structure for imparting motion to the lift bar structure.

7. The improvement set forth in claim 1 in which the point of mounting of each said support arm structure to said frame structure comprises a cantilever mounting of the support arm structure on the frame structure.

8. The improvement set forth in claim 1 in which each support arm structure comprises plural elements disposed in parallelism with each other.

9. The improvement set forth in claim 8 in which the point of mounting of each said support arm structure to said frame structure comprises a cantilever mounting of the plural elements on the frame structure.

10. The improvement set forth in claim 8 in which the plural elements comprise resiliently yieldable elements which are normally flat in their free state but which flex from their normally flat condition during operation of the conveyor.

11. The improvement set forth in claim 1 wherein each of the support arm structures has its respective points of mounting at horizontally spaced locations along the length of the conveyor.

12. The improvement set forth in claim 11 in which each of such support arm structures comprises a pair of support arm elements which confront each other but which are separated at opposite ends by spacers at their respective mountings to the frame and lift bar structures and in which the support arm elements are of a resiliently yieldable materials which allows them to flex during displacement of the lift bar structure.

13. In a humper type conveyor for conveying articles along a path of travel having frame structure, rail structure supported on the frame structure, and lift bar structure which is cyclically displaceable toward and away from the rail structure, said rail and lift bar structures being constructed and arranged in substantial parallelism along the path of travel to cooperatively support conveyed articles along the path of travel and to convey them in such a manner that displacement of the lift bar structure toward the rail structure causes the articles to pivot about their points of support on the lift bar structure with the result that their points of support on the rail structure move forwardly along the path of travel and such that during displacement of the lift bar structure away from the rail structure the articles pivot about their points of support on the rail structure with the result that their points of support on the lift bar structure move forwardly along the path of travel, the improvement for mounting the lift bar structure on the frame structure which comprises support arm structure disposed generally parallel to the path of travel of the articles, mounting structure via which the support arm structure mounts on the frame structure and mounting structure via which the lift bar structure mounts on the support arm structure, and wherein the support arm structure comprises plural elements disposed in parallelism with each other, and the plural elements comprise resiliently yieldable elements which are normally flat in their free state but which flex from their normally flat condition during operation of the conveyor.

14. In a humper type conveyor for conveying articles along a path of travel frame structure, rail structure supported on the frame structure, and lift bar structure which is cyclically displaceable toward and away from the rail structure, said rail and lift bar structures being constructed and arranged in substantial parallelism along the path of travel to cooperatively support conveyed articles along the path of travel and to convey them in such a manner that displacement of the lift bar structure toward the rail structure causes the articles to pivot about their points of support on the lift bar structure with the result that their points of support on the rail structure move forwardly along the path of travel and such that during displacement of the lift bar structure away from the rail structure the articles pivot about their points of support on the rail structure with the result that their points of support on the lift bar structure move forwardly along the path of travel, the improvement for mounting the lift bar structure on the frame structure which comprises support arm structure disposed generally parallel to the path of travel of the articles, mounting structure via which the support arm structure mounts on the frame structure and mounting structure via which the lift bar structure mounts on the support arm structure, and wherein the support arm structure comprises a plurality of individual support arm structures at spaced locations along the length of the conveyor, each individual support arm structure being mounted to the frame and the lift bar structures, and in which each of the individual support arm structures comprises a pair of support arm elements which confront each other but which are separated at opposite ends by spacers at their respective mountings to the frame and the lift bar structures and in which the support arm elements are of a resiliently yieldable material which allows them to flex during displacement of the lift bar structure.

15. The improvement set forth in claim 6 in which the eccentric is operable about an axis lying in a vertical plane which passes through the lift bar structure.

* * * * *